Oct. 7, 1969    R. PARTHUM    3,470,715
ROUND KNITTING MACHINE FOR THE PRODUCTION OF RUNPROOF STOCKINGS WITH A WELT
Filed Aug. 29, 1966    5 Sheets-Sheet 1

INVENTOR.
RICHARD PARTHUM
BY
Woodhams, Blanchard & Flynn
ATTORNEYS

Oct. 7, 1969  R. PARTHUM  3,470,715
ROUND KNITTING MACHINE FOR THE PRODUCTION OF RUNPROOF
STOCKINGS WITH A WELT
Filed Aug. 29, 1966  5 Sheets-Sheet 2

INVENTOR.
RICHARD PARTHUM
BY
Woodhams, Blanchard & Flynn
ATTORNEYS

Oct. 7, 1969 R. PARTHUM 3,470,715
ROUND KNITTING MACHINE FOR THE PRODUCTION OF RUNPROOF
STOCKINGS WITH A WELT
Filed Aug. 29, 1966 5 Sheets-Sheet 3

INVENTOR.
RICHARD PARTHUM
BY
Woodhams, Blanchard & Flynn
ATTORNEYS

Oct. 7, 1969 R. PARTHUM 3,470,715
ROUND KNITTING MACHINE FOR THE PRODUCTION OF RUNPROOF
STOCKINGS WITH A WELT
Filed Aug. 29, 1966 5 Sheets-Sheet 4

INVENTOR.
RICHARD PARTHUM
BY
Woodhams, Blanchard Flynn
ATTORNEYS

Oct. 7, 1969    R. PARTHUM    3,470,715
ROUND KNITTING MACHINE FOR THE PRODUCTION OF RUNPROOF
STOCKINGS WITH A WELT
Filed Aug. 29, 1966    5 Sheets-Sheet 5
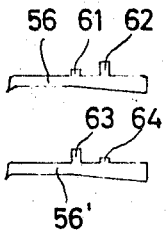
FIG. 14 a
FIG. 14 b
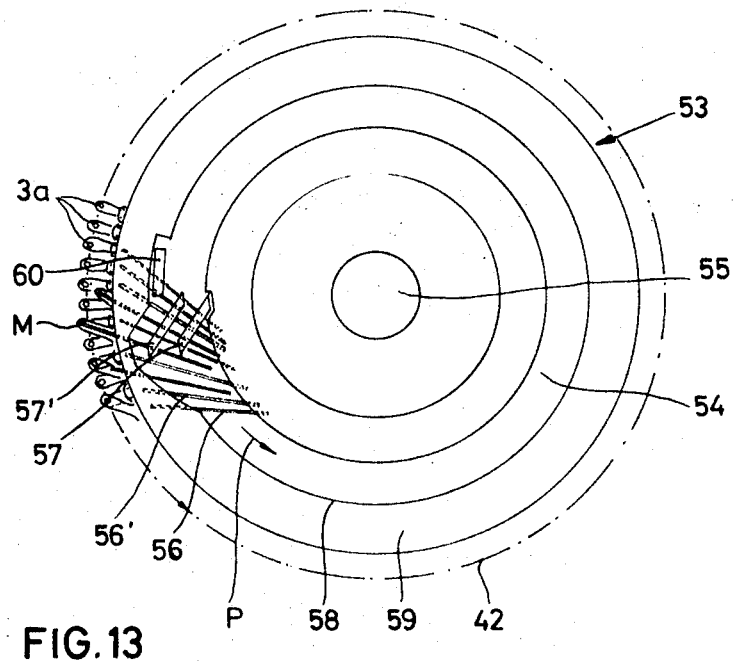
FIG. 13
INVENTOR.
RICHARD PARTHUM
BY
ATTORNEYS

# United States Patent Office 3,470,715
Patented Oct. 7, 1969

3,470,715
ROUND KNITTING MACHINE FOR THE PRODUCTION OF RUNPROOF STOCKINGS WITH A WELT
Richard Parthum, Nojsourheolsvij 43, Lyngby, Copenhagen, Denmark
Filed Aug. 29, 1966, Ser. No. 575,738
Claims priority, application Germany, Aug. 30, 1965, P 37,567
Int. Cl. D04b 15/02, 9/04, 13/00
U.S. Cl. 66—95                                9 Claims

ABSTRACT OF THE DISCLOSURE

A circular knitting machine having a rotating needle cylinder having longitudinal slots in which are arranged separately controlled, movable needles. A sinker supporting ring surrounds the upper edge of the needle cylinder and rotates synchronously therewith, the sinker supporting ring having arranged therein sinkers movable radially with respect to the needle cylinder. A carrier is positioned adjacent one end of the needle cylinder and has a plurality of slideable transfer elements mounted thereon and positioned inside the circumference of the needle ring. The transfer elements have stitch engaging portions which move at an angular speed different from the angular speed of the needle cylinder. The transfer elements are positioned inside of the tubular knitted fabric and engage loops in a row of loops which has already been cast off the needles. The transfer elements widen the loops laterally along the cast-off row and transfer same transversely to an adjacent row such that the loops engage respective needles which are positioned in an adjacent row and in an adjacent wale.

---

The invention relates to a circular knitting machine for the production of run-proof hosiery having a double welt. Said machine comprises a rotating needle-carrying cylinder having longitudinal slots in which are arranged separately controlled, movable needles. Said machine further comprises a sinker supporting ring surrounding the upper edge of the needle-carrying cylinder and rotatable synchronously with the needle cylinder, said sinker supporting ring having arranged therein sinkers movable radially controllable with respect to the needle cylinder. The machine also comprises holding devices for holding back at times at least the first row of stiches to produce the double welt and, finally, comprises a carrier arranged inside of the needle cylinder circumference and driveable at an angular speed different from the angular speed of the needle cylinder, said carrier providing longitudinally movable transfer elements which are controlled in a way that they engage with stitches in the material, widen same and transfer the stitch laterally to a needle which is directly or closely adjacent to the needle which produced the stitch.

Runs in stockings are known to be caused by breaking of a stitch which then frees the next stitch in the wale of stitches itself so that said stitch slides through its holding stitch to free same and so on, until the wale of stitches is completely unraveled. To prevent forming of a run it is known to take out stitches from the wale of stitches during the production of the stocking and to transfer said stitches laterally to a needle which is adjacent to the needle which produces the respective wale of stitches. By this, stitches are produced in each wale of stitches which are not secured in the preceding stitch of the same wale but are secured in the stitch of an adjacent wale. Consequently a run in the respective wale can run only to the laterally transferred stitch because the transferred stitch is not also set free when the preceding stitch is set free.

Transfer elements are needed in a circular knitting machine for lateral transfer of stitches, which transfer elements engage with a knitted stitch or a stitch hanging on a needle and widen the stitch laterally so that an adjacent needle is able to engage with the stitch. Said transfer elements must be guided and controlled in a carrier. Thereby the problem arises as to where to arrange said carrier taking in consideration the conditions of limited space in a circular knitting machine for hosiery.

Circular knitting machines presently used in practice are provided with a dial disk arranged in the zone of the upper edge of the needle cylinder and within the circumference of the needle cylinder, said dial disk being provided with radially movable sinkers positioned therein. Said sinkers are used as holding devices to hold back at least the first row of stitches, which now is later united with the knitting to produce the usual double edge and which is set free by the sinkers of the dial disk. The knitting thereby passes through between the upper edge of the needle cylinder and the periphery of the dial disk to the inside of the needle cylinder. It is difficult to provide a carrier which carries transfer sinkers which engage with the stitches of the knitting.

So far a solution to this problem is known from U.S. Patent No. 3,110,167. The carrier for the transfer sinkers of this patent is constructed as a cylinder which is arranged directly inside the wall of the needle cylinder and which is widened funnel-shaped at its upper end. The transfer elements are guided upwardly and outwardly inclined from below and inside and from the outer side of the knitting into the stitch to be transferred. This solution is not easy to accomplish practically because the long, flexible transfer members in the slot-shaped space between the upper part of the needle cylinder and the dial disk must be moved with the highest degree of precision.

Recently a circular knitting machine for the production of stockings became known in which the function of holding back at least the first row of stitches for the production of the double edge is assigned to the sinkers arranged outside around the needle cylinder, in addition to their actual function of cooperating with the needles for the production of stitches. Such a knitting machine is described in U.S. Patent No. 3,254,509. Furthermore, other knitting machines are known in which isolated sinkers are positioned in the sinker supporting ring for holding back at least the first row of stitches to produce the double edge. Said circular knitting machines possess considerable advantages with respect to the problems of positioning the carrier containing the transfer elements in that they operate without a central dial disk.

The basic purpose of the invention is to manufacture a circular knitting machine simple in construction and reliable in operation for the production of stockings with a double edge which are made run-proof by lateral transfer of single stitches. Starting with a circular knitting machine of the above type, this is achieved according to the invention in that the holding members are constructed at the sinkers in a conventional manner as described in U.S. Patent No. 3,254,509, especially the sinkers which are provided in the sinked supporting ring, and wherein the carrier is arranged in the zone of the upper edge of the needle cylinder inside of the knitting and is movable downwardly into the needle cylinder so that the transfer elements engage with the knitting from the inside thereof.

The invention is based on the fact that the known circular knitting machines as illustrated in U.S. Patent No. 3,254,509 in which the double edge is produced by the sinkers arranged outside of the needle cylinder periphery are particularly suitable for the production of run-proof stockings. In such circular knitting machines the carrier which mounts the transfer elements for transferring the stitches can be placed in the region inside of the needle cylinder, which region otherwise is occupied by the dial disk and which is unnecessary on these machines. A carrier arranged at this place is readily accessible and can easily be driven from above. The carrier can be mounted with relatively short, rigid transfer elements. The path of the transfer elements relative to the carrier is short. In addition, a reliable operation of the transfer elements is guaranteed. The transfer elements engage the knitting from inside so that the transfer elements can be easily controlled in a way that they only touch the material to be transferred and do not touch the remaining knitting. There is, therefore, no danger or damage to the knitting during transfer.

In a preferred form of construction of the invention, the needle cylinder and the carrier are arranged coaxially. The carrier can in this case extend around the complete periphery of the needle cylinder near the upper edge thereof so that the periphery of the needle cylinder in which the transfer occurs can be arranged at any desired location in the needle cylinder.

A first cam arrangement stationary relative to the carrier is provided for movement of the transfer elements radially with respect to the needle cylinder. A second cam arrangement stationary relative to the carrier is also provided for movement of the operating ends of the transfer elements in the axial direction of the needle cylinder. The transfer elements and the cam arrangements cooperate to cause the operating ends of the transfer elements to rotate in a raised and retracted position outside the zone of the needle cylinder circumference provided for the lateral transfer of stitches. The operating ends are moved radially outwardly in the transfer zone and are lowered into the stitch to be transferred without touching the remaining knitting. They are then raised after engagement with the stitch and are moved laterally over at least one sinker and a needle head until the stitch is sufficiently widened laterally so that the needle taking up the stitch is moved into the stitch after which the transfer elements are retracted radially inwardly. A very exact movement of the transfer elements is assured by the two camming arrangements so that damage to the knitting during transfer of the stitch is impossible.

In the preferred embodiment of the invention, the carrier is arranged in a stationary housing which provides an upper and a lower housing shell between which a circumferential slot is provided for receiving the operating ends of the transfer elements. In this, the first camming arrangement consists of a cam lobe and a cam root, both of which are provided in the upper housing shell, while the second cam arrangement is provided with a control cam supporting the outer ends of the transfer elements at the outer edge of the lower housing shell. By arranging the carrier in a housing the transfer elements and their guiding and control members are well protected. This is very important in view of the unavoidable formation of dust in textile factories. At the same time the housing offers a simple means for constructing and locating the cam arrangements.

The second camming arrangement advantageously provides in addition to the control cam a control shoe which acts from above onto the transfer elements in the transfer zone. The control shoe effects a positive control downwardly which is more reliable than if the control in this direction would be effected only by the control cam of the lower housing shell.

The cam lobe advantageously is constructed at a cam disk which is movable in the upper housing shell from an operating to a rest position and vice versa. The radial control can be inactivated if no stitches are to be transferred.

The control shoe advantageously can be raised from an operating to a rest position and vice versa. Thereby, without an adjustment of the cam lobe, a transfer of stitches can occur only over a part of the stocking circumference by a periodical engaging and disengaging of the control shoe.

Each transfer element is advantageously tapered toward its operating end and has an upwardly projecting lug cooperating with the control shoe, said lug having an upper edge parallel to the lower edge of the transfer elements. By tapering of the transfer element toward the operating end, the reciprocal movement of the operating end in the circumferential slot between both housing shells is made possible. Nevertheless, the control of the reciprocal movement can be carried out accurately since the control shoe acts onto the upper edge of the lug which is parallel to the lower edge of the transfer element.

To prevent an undesired lateral movement of the transfer elements, it is advantageous that at each transfer element a leaf spring is provided for laterally engaging the wall of the guiding slots.

To securely engage the stitches it is advantageous to construct the operating end of each transfer element as a downwardly projecting and upwardly opening hook.

If the transfer element is to assist the lateral widening of the stitch to be transferred, it is desirable that the operating end of each transfer element be bent laterally and be provided below with a forwardly projecting point. The lateral bending is then used to widen the stitch to be transferred laterally while the projecting point is able to engage securely with the stitch.

To exchange the transfer elements at the machine without other demounting means, it is preferably provided that the transfer elements and the circumferential slot are arranged with respect to each other in such a way that the transfer elements in the transfer zone can be pulled out of the guiding slots of the carrier by a force directed outwardly and downwardly.

Instead of a cam control of the transfer elements in the axial direction of the needle cylinder, it can be provided that the guiding slots in the carrier are sloped upwardly from the inside to the outside in a way that the transfer elements during their outward movement engage with stitches from below and inside. Further, said elements are positioned at such a height that, with their operating ends in the outermost position, they are movable over the sinkers and needle heads without additional vertical control. In this type of construction, the cam motion for movement of the operating ends of the transfer elements in the vertical direction is minimized since the transfer sinkers during their movement in the sloped guiding slots provide an upward or downward component of movement. In this case, a radial control arrangement for the transfer sinkers is sufficient, which thus helps to simplify the construction.

In the last-mentioned type of construction of the circular knitting machine of the invention, the carrier preferably is a shell with sloped edges including the guiding slots which are closed from above by a stationary cover plate which comprises a radial control cam for the transfer elements. By this there is obtained a simple mounting together with an effective control of the transfer elements.

If the stitches are not to be laterally widened too much during lateral transfer, it is preferred if the transfer elements in the carrier are guided at an angle to the radial direction. Thus, the transfer elements engage with the knitting not in direction of the wale of stitches but at an angle to same so that they pull out the stitch to be transferred at an angle with respect to the knitting. In this way the lateral widening is not as great as it might be if the stitches were engaged in the direction of the wale and then were transferred perpendicularly with respect to the direction of the wale.

It is also possible to achieve patterns in the stockings by transfer of stitches with the circular knitting machine of the invention. For this purpose the transfer elements can be provided with two or more control feet, each of which cooperates selectively with a control cam arrangement which can be activated by a programming device.

Illustrative embodiments are set forth in the drawings.

Figure 1:
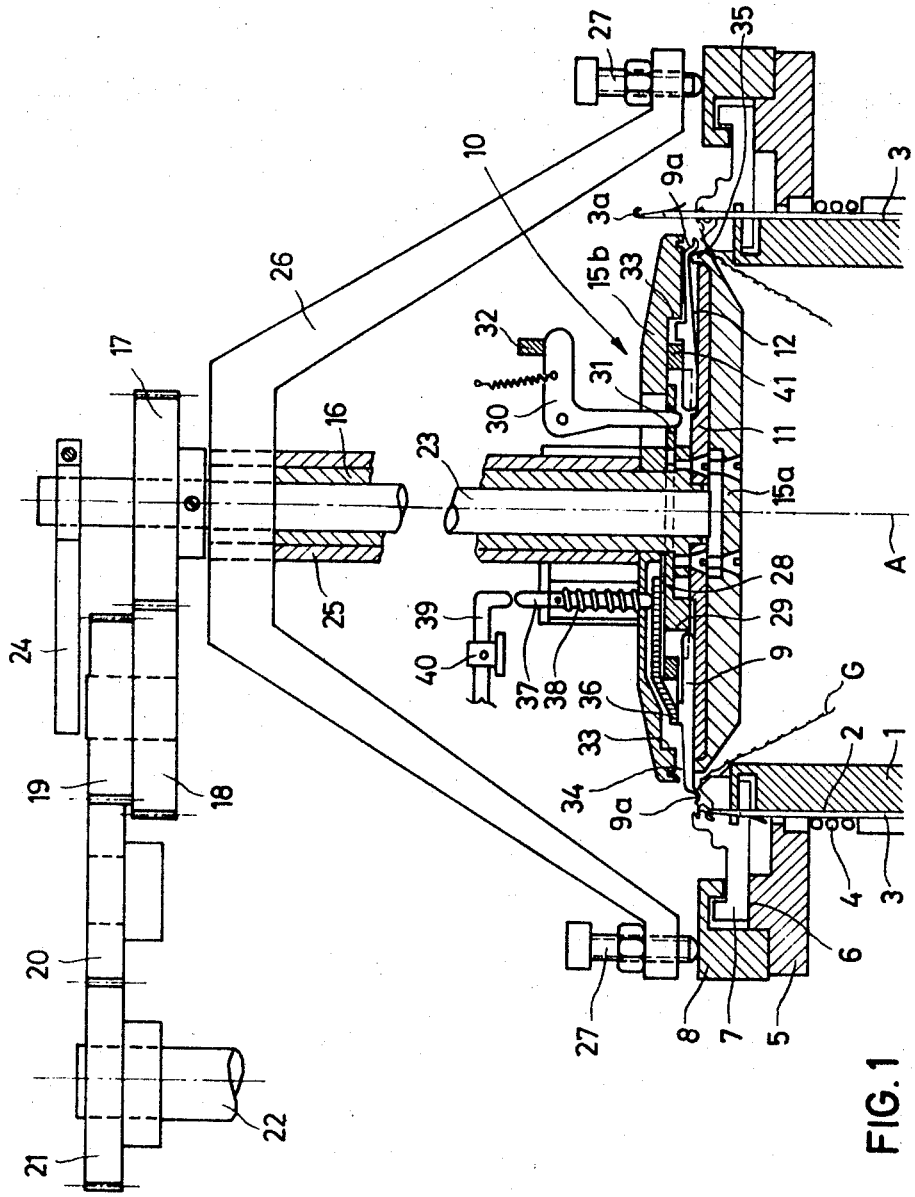
FIGURE 1 is a vertical section through the upper part of a circular knitting machine according to the invention.
Figure 2:
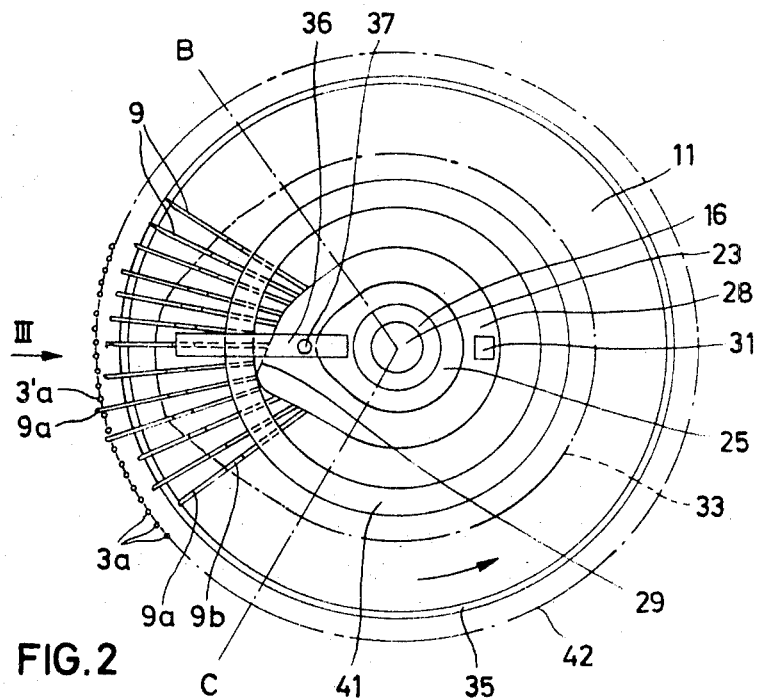
FIGURE 2 is a top view of the needle cylinder and the carrier for the transfer elements of the machine according to FIGURE 1, but omitting the sinker supporting ring and the cover and also the drive for the carrier.
Figure 8A:
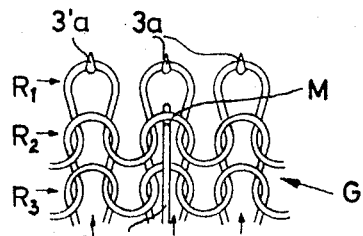
Figure 8B:
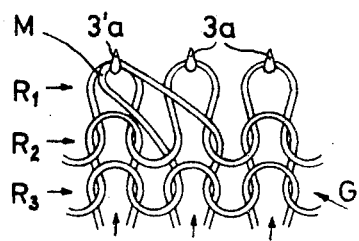
Figure 8C:
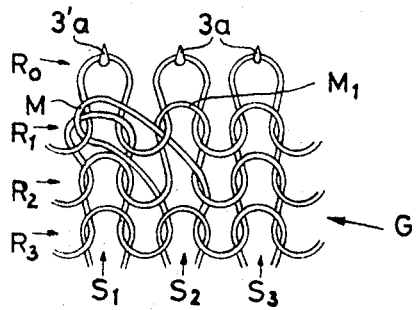
Figure 9:
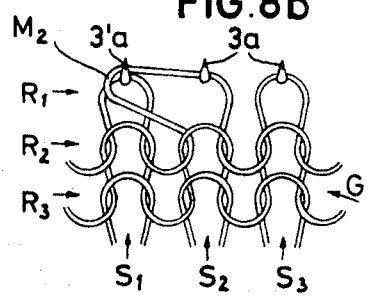
Figure 10:
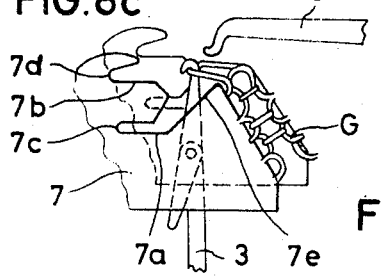
Figure 11:
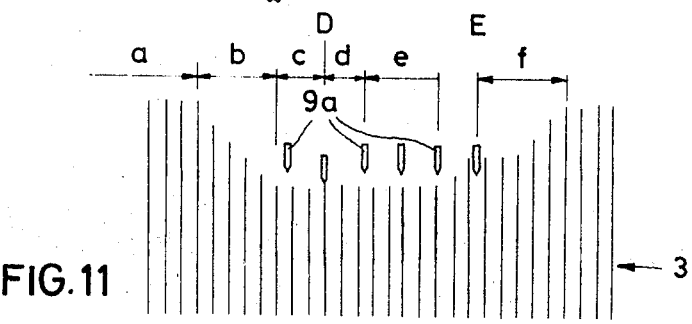
Figure 12:
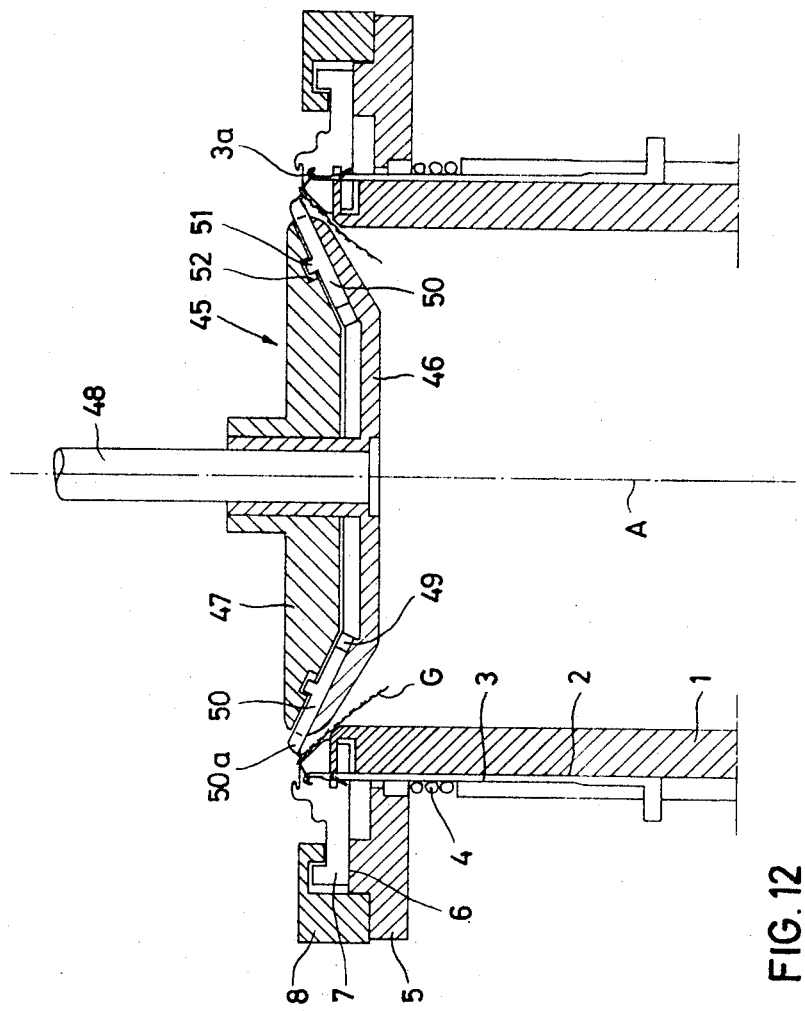

FIGURE 8a–c are three stages of operation which ilustrate the transfer of a stitch from a wale of stitches to the following row of stitches of the adjacent wale of stitches;

FIGURE 9 illustrates a stitch of the same row of stitches transferred to the adjacent wale of stitches;

FIGURE 10 is a perspective view of the element parts participating at the transfer of stitches;

FIGURE 11 is a schematized, unrolled, illustration of the transfer of stitches at needle cylinders and carriers;

FIGURE 12 is a vertical section corresponding to FIGURE 1 through the upper part of a modified embodiment of the circular knitting machine of the invention;

FIGURE 13 is a schematic top view corresponding to FIGURE 2 of a still further embodiment of the circular knitting machine of the invention;

FIGURES 14a and b illustrate two transfer elements of the invention according to FIGURE 13.

FIGURE 1 illustrates a vertical section through the upper parts of a circular knitting machine. The lower part with the drive and takeoff devices for the stocking is of usual construction and therefore is not illustrated and described.

A needle cylinder is positioned rotatably about a vertical, theoretical, axis A and is driven by the main drive of the machine not shown. In longitudinally extending slots 2 in the outer surface of the needle cylinder 1, hooked needles 3 are guided for longitudinal movement. The movement of the needles 3 is controlled by a cylinder cam assembly (not illustrated) corresponding to the knitting and stitch transfer process. They are kept in longitudinally extending slots 2 by annular springs 4 surrounding the needle cylinder. The needle cylinder 1 in the region of its upper edge is surrounded by a sinker supporting ring 5 which is coupled with the needle cylinder 1 for synchronous rotation. Sinkers 7 are guided movably radially to the needle cylinder 1 in horizontal guiding slots 6 of the sinker supporting ring 5. The movement of the sinkers 7 is controlled by a stationary sinker supporting cam 8. The above described circular knitting machine structure and operation is conventional and well known, being described and illustrated in detail in U.S. Patent No. 3,254,509. Thus, further description thereof is not believed necessary.

As can best be seen in FIGURE 10, each sinker 7 comprises a lower cast-off ledge 7a, an upper cast-off ledge 7b set back with respect to the lower edge and a lower and upper notch 7c and 7d. The sinkers 7 work together with the needles 3 not only to form a knitting G in the usual manner, but they also act to hold back the first row of stitches to achieve a double edge and after the double edge is formed, unite same with the rest of the knitting through a lobe 7e formed on the lower cast-off ledge. How the needles 3 and the sinkers 7 must be moved to perform the above double edge operation is described in detail in U.S. Patent No 3,254,509 and is not the subject matter of the present invention. For general background purposes, the forming of the double edge is done by first producing at least one row of stitches on the lower ledges 7a and same is then kept on the needles 3 by the lower notch 7c. The following rows of stitches are then produced on the upper ledge 7b until the double edge is completely knitted. Then the rows of stitches are freed from the needles and are united with the other knitting by means of the lobe 7e.

The operating principle for making the knitting G run-proof is illustrated by FIGURES 8a–c and 9 and will be described hereinbelow. Three wales of stitches $S_1$, $S_2$ and $S_3$ and three rows of stitches $R_1$, $R_2$ and $R_3$ are illustrated. FIGURE 8a shows the knitting hanging with the row of stitches $R_1$ in the hook-shaped needle heads 3a. A transfer element 9 engages with the stitch M of the wale of stitches $S_2$ from inside of the knitting and without touching same. Said transfer element grips the stitch M and widens same sideways and transfers same from the wale of stitches $S_2$ and the row of stitches $R_2$ to the adjacent wale of stitches $S_1$ and to the following row of stitches $R_1$, thereby transferring the stitch to the needle 3 forming the wale of stitches $S_1$ Immediately following the transfer of the stitch M the knitting G looks as illustrated in FIGURE 8b. After the row of stitches $R_1$ is thrown off from the needle heads 3a and after a new row of stitches $R_0$ is formed, the stitch M is kept on the wale of stitches $S_1$. If the stitch $M_1$ following the stitch M is broken in the stitch wale $S_2$ or is set free by means of a run extending to this point, no further running can occur since the stitch M is kept in the adjacent wale $S_1$. The total texture G can be made run-proof to a high extent by regularly transferring from each wale of stitches one stitch to an adjacent wale.

Instead of transferring the stitch according to FIGURES 8a–c to an adjacent row of stitches, the stitch can also be transferred laterally in the same row of stitches. For this purpose the stitch is widened laterally by a transfer element as illustrated at the stitch $M_2$ in FIGURE 9 without being taken off by the needle which produced same. After widening of the stitch an adjacent needle is guided into the same stitch so that the stitch $M_2$ is afterwards secured on both wales of stitches $S_1$ and $S_2$. The mechanism for widening and transferring the stitches is fully explained hereinbelow.

Figure 4:
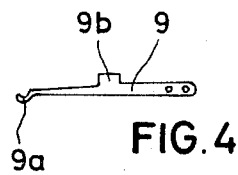
FIGURE 4 is a side elevational view of a single transfer element.
Figure 5:
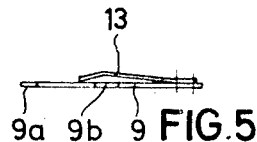
FIGURE 5 is a top view of the same transfer element.

To make the stitch transferring principle illustrated in FIGURES 8a–c and 9 work for the circular knitting machine of FIGURE 1, a stitch transfer mechanism 10 is arranged inside of the needle cylinder 1. The stitch transfer mechanism 10 takes the place of the dial disk usually found in this location in circular knitting machines customarily used in practice at present. The stitch transfer medium 10 comprises a disk-shaped carrier 11 with radial guiding slots 12, which carrier usually is positioned deeper than the dial disk. The transfer elements 9 are arranged longitudinally movably in the guiding slots 12. The shape of the transfer elements 9 used for the machine of FIGURE 1 is illustrated in FIGURES 4 and 5. Relatively rigid, short and plate-like transfer elements are used here which are tapered toward their hook-shaped operating ends 9a and which are provided with a lug 9b at their upper surfaces. The upper edge of each thereof is parallel with the lower edge of the transfer element. Onto one side surface of each transfer element 9 an arcuate leaf spring 13 is riveted which assures that the transfer elements 9 in the guiding slots do not transmit any unnecessary swinging or tipping motion.

Figure 6:
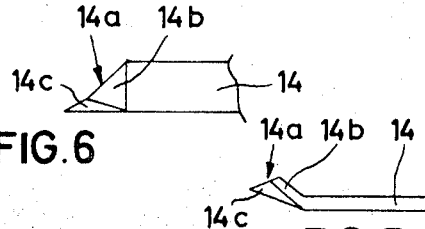
FIGURE 6 is a side elevational view of the operating end of a transfer element modified with respect to FIGURES 4 and 5.
Figure 7:
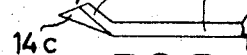
FIGURE 7 is a top view of the operating end of the transfer element of FIGURE 6.

If a large stitch widening is desired, transfer elements are preferably used as illustrated in FIGURES 6 and 7. The transfer elements 14 are provided with operating ends 14a which comprise a section 14b bent laterally from the plane of the transfer elements 14 and comprise a point 14c projecting forwardly at the bottom surface of the section 14b.

The carrier 11 is locked into a housing which consists of a lower shell 15a and an upper shell 15b. The carrier is carried by a vertical hollow shaft 16 extending into the housing; the hollow shaft is arranged coaxially to the axis A. The shaft 16 is driven by the main drive of the machine (not illustrated) through a gear 17–21 and through an intermediate shaft 22 with a rate of rotation a little different than the rate of rotation of the needle cylinder 1. The lower housing shell 15a is screwed to the lower end of an axle 23 projecting coaxially through the hollow shaft 16. The axle can be rotated by means of a schematically illustrated adjusting lever 24, but same is stationary during operation. The upper housing shell 15b is pressed onto a hub jacket 25 which rotatably receives the hollow shaft 16. Hub 25 and axle 23 are nonrotatable and are supported by a stationary pedestal 26 and by adjusting screws 27 on the lock ring 8.

For guiding the transfer elements 9 radially relative to the needle cylinder 1, a cam disk 28 is arranged in the hollow area of the upper housing shell 15b, one sector of the cam being provided with a cam lobe 29 against which the rear ends of the transfer elements 9 are adapted to abut. The cam disk 28 can be moved rightwardly into a rest position from the operating position illustrated in FIGURE 1. When in the rest position, the rear ends of the transfer elements 9 no longer touch the lobe 29. Said movement is effected by a spring tensioned bell crank 30 which engages into a recess 31 of the cam disk 28 and moves same after disengagement of a stop 32.

While the lobe 29 of the cam disk 28 effects the radial movement of the transfer elements 9 outwardly, a cam lobe 33 is provided for the return movement of the transfer elements 9 radially inwardly, said cam being provided in the upper housing shell 15b and cooperating with the upward projecting lug 9b of the transfer elements.

The operating ends 9a of the transfer elements 9 project from a circumferential slot 34 between the housing shells 15a, 15b. To control the movement of the operating ends 9a in the axial direction of the needle cylinder, a control cam 35 is attached to the outer edge of the lower housing shell 15a having a cam-shaped upperside on which the operating ends 9a of the transfer elements 9 are supported. Furthermore a control shoe 36 acts in an axial direction as the control of the transfer elements 9, said control shoe is arranged adjustably in height in the upper housing shell 15b and acts against the upper edge of the lugs 9b of the transfer elements 9. The control shoe 36 is moved into operating position as illustrated in FIGURE 1 against the pressure of a spring 38 by a plunger 37, which plunger is fixedly connected to the shoe 36 and is slideably mounted within housing shell 15b. A lever 39, mounted in an adjustable pivot bearing 40, acts on the plunger 37. If the lever 39 is moved counterclockwise upwardly, the control shoe 36 is no longer under pressure and moves into a rest position where it no longer contacts the lugs 9b of the transfer elements 9.

Moreover, the movements of the transfer elements 9 in the guiding slots 12 of the carrier 11 is controlled by a ring 41.

Figure 3:
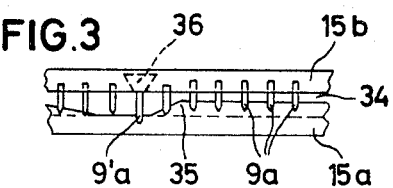
FIGURE 3 is a side elevational view on the carrier in the stitch transfer sector taken in direction of the arrow III in FIGURE 2.

The method of operation of the machine described so far during transfer of stitches is described hereinbelow with reference to FIGURES 1–3:

From FIGURE 2, which is a schematic top view of the carrier 11 illustrating the transfer elements 9 and several cam arrangements, and wherein the needle cylinder and the parts surrounding same are omitted, the circular path 42 is traversed by the needle heads 3a as same rotate. The circumferential zone wherein the transfer of stitches takes place is provided between the lines B and C of the needle path 42.

Outside of the stitch transfer zone B–C, the transfer elements 9 rotate in the retracted position and, by means of the control cam 35, are in the raised position as is illustrated in the right half of FIGURE 1. The transfer elements are thereby positioned inside of the needle ring so that the needles can, as also shown in the right half of FIGURE 1, be brought into a raised position. Such a position is necessary for single needles when, by back and forth swinging of the needle cylinder, the heel of the stocking must be knitted in the known manner.

As soon as the transfer elements 9 enter the stitch transfer zone B–C, the cam lobe 29 acts on their inner ends and moves them radially outwardly. At the beginning of the operation, their operating ends 9a are still lifted and are supported by the control cam 35. As the control shoe 36 is approached, the guiding edge of the control cam 35 lowers (FIGURE 3) so that the operating ends 9a lose their support. When the operating end 9a of the transfer element 9 is positioned above the stitch to be transferred, same is pressed downwardly into the stitch by the working control shoe 36 which acts onto the lug 9b of the transfer element 9 from above. Said position is illustrated at the operating end 9′a in FIGURE 3. This figure also shows how the guiding edge of the control cam 35 lowers first so that the operating ends 9a are free to move downwardly. When beneath the control shoe 36, the transfer elements are moved further outwardly by the cam 29 so that they engage with the stitch to be transferred. In this manner, the position illustrated in FIGURE 8a is achieved. During further movement of the carrier 11, which rotates slower or faster than the needle cylinder 1 depending on the side to which the stitch is to be transferred, the operating ends 9a are lifted again by the control cam 35. Said movement is possible because the transfer elements at this point have been sliding out laterally underneath the control shoe 36. At the same time the transfer elements are moved further outwardly by the cam lobe 29 so that the stitch is widened laterally and outwardly. During the above-described movement the operating ends 9a of the transfer elements 9 are moved over one of the two sinkers 7 which have held the picked-up stitch and also over an adjacent needle head 3′a. As soon as this has happened, the respective needle 3′a is moved upwardly by the cylinder cam assembly and engages with the widened stitch. Said position is shown in FIGURE 8b. The lug 9b of the transfer elements now abuts the low side of the cam 33 which guides the transfer elements to the end C of the stitch transfer zone back into the initial position. The cam lobe 29 is shaped so that same does not hinder said return movement.

The sequence of movement can schematically be seen in FIGURE 11 which shows the needles 3 and the operating ends 9a of the transfer elements in an unrolled illustration of the needle cylinder. The section a is provided with sinkers, not illustrated, which cooperate with the needles 3 to produce stitches in a conventional manner, the needles 3 being in a lifted position by the cam assembly. In section b the needles are lowered by the cam assembly and the sinkers are drawn back slightly outwardly by the cam ring 8. These then hold the stitches ready for engagement by the transfer elements. The operating ends 9a of the transfer elements are lowered in section c into the respective prepared stitch and engage with the stitch at point D. In the section d the operating ends 9a are lifted again. The needles 3 are lowered sufficiently from the point D through the following section d and the section e that the operating ends 9a can be moved over the needles. After section e the needles are raised again. At point E the transfer elements pass the stitch to be transferred onto the receiving needle and through section f the needles slide upwardly again. In this zone the transfer elements are again retracted.

The amount of withdrawal of the sinkers 7 during the transfer process depends on whether the stitches are to be transferred according to FIGURES 8a–c or according to FIGURE 9. In the latter case the sinkers 7 must be retracted farther outwardly than in the first case. The farther retracted position is illustrated in FIGURE 10. Here the transfer element 9 engages with the stitch hanging on one needle, while same in the other case engages with a stitch which already has been dropped.

It is known that in circular knitting machines the size of the stitches is changed by height adjustment of the needle cylinder. The sinker supporting ring 5 follows said movement with the cam ring 8. Since the transfer mechanism 10 is supported on the cam ring 8 by the adjusting screws 27, which effects the height adjustment by the pedestal 26 and the hub jacket 25, the transfer mechanism remains at the correct height during change of size of the stitch by means of adjustment of the needle cylinder 1.

A further possibility of adjustment is to use transfer elements which possess a larger movement in the axial direction of the needle cylinder. The respectively desired axial path can then be achieved by adjustment of the motion of the plunger 37. Its motion can be changed by lateral adjustment of the pivot bearing 40. The adjustment of the pivot bearing 40 is done in such a way that the more the pivot bearing is moved to the left, as shown in the drawing, the more the control shoe 16 is lowered for stitch enlargement. A leftward movement of the pivot bearing 40 means an enlargement of the stroke of the plunger 37 during constant motion of the drive arm of the lever 39.

It is possible in the illustrated and described machine to transfer stitches over the total stocking circumference or to transfer stitches selectively over only a part of the circumference. The transfer function can, as mentioned, be cut off either by an adjustment of the cam disk 28 or by raising of the control shoe 36.

The transfer elements 9 can be changed by simple means. Namely in the transfer section they can be pulled out downwardly from the carrier where the circumferential slot 34 is the deepest without dismounting other parts. Such an exchange may be necessary if transfer elements are damaged or if differently shaped transfer elements, for example those of FIGURES 6 and 7, are to be inserted. The latter necessity can occur if a greater lateral widening of stitches is desired, for example, to produce a knitting as appearing in FIGURE 9.

The construction of the circular knitting machine illustrated in FIGURE 12 differs from the construction of FIGURE 1 only in the construction of the transfer mechanism. The remaining parts of the machine are not changed with respect to FIGURE 1 and are therefore provided with the same reference numerals. The round knitting machine of FIGURE 12 is provided with a transfer mechanism 45 which consists of a shell-like carrier 46 and cover plate 47. The carier 46 is rotatably secured to the shaft 48 which rotates with a rate of rotation differing slightly from the rate of rotation of the needle cylinder 1. The cover plate 47 is stationary. In the conical part of the carrier 46 guide slots 49 are arranged for transfer elements 50. The transfer elements 50 are radially movable in the slots 49 and provide for this purpose an upwardly extending guiding rail 51 which engages with a guide channel or cam groove 52 in the cover plate 47. The inclination of the slots 49 is chosen so that the transfer elements 50 with their operating ends 50a are positioned in their outermost position above the sinker 7 and above the needle head 3a. The operating principle during transfer of stitches is the same in the machine of FIGURE 12 as in the machine of FIGURES 1 to 3. The machine of FIGURE 12 is a little easier to construct since the transfer elements 50 do not need separate control means for movement in the axial direction of the needle cylinder 1.

The construction of FIGURE 13 illustrates another transfer mechanism 53 which is arranged within the needle path 42 of the circular knitting machine which otherwise with respect to FIGURES 1 to 12 is unchanged. For a better inspection the needle cylinder and its surrounding parts are not illustrated.

Again the transfer mechanism 53 is provided with a carrier 54 which by means of a vertical shaft 55 rotates with a number of rotations slightly different from the rotation of the needle cylinder in the direction of the arrow P, which is also the direction of rotation of the needle cylinder. The carrier 54 contains transfer elements 56 and 56' which are alternately positioned across the periphery of the carrier and which are of the shape illustrated in FIGURES 14a and 14b. The transfer elements 56 and 56' are guided movably in guiding slots, not illustrated. The characteristic of the transfer mechanism 53 is that the guiding slots do not extend radially but they are inclined at a 45 degree angle with respect to the radii of said transfer mechanism. The guiding slots in the illustrated embodiment are inclined opposite to the direction of rotation with respect to the radii, however the guiding slots could also be arranged at other angles with respect to the radii.

To guide the transfer elements 56, 56' in the transfer zone outwardly, the cam control elements 57, 57' are provided which are stationary relative to the carrier 54. The cam elements contact the lugs 61 or 62 and 63 or 64 for moving the transfer elements 56, 56' outwardly into the stitch transfer zone. To retract the tansfer elements from their advanced position, a retracting cam 58 coacting with the lugs 61 and 63 is used, cam 58 being fomed on a stationary ring 59. Furthermore a control shoe 60 is provided again which in cooperation with an axial control cam, not shown, controls the movement of the operating ends of the transfer element in the axial direction of the needle cylinder. The sequence of movement in principle is the same as the movement at the transfer elements of the circular knitting machine of FIGURES 1 to 3. Therefore a second description of said movement is not necessary. However, the embodiment of FIGURE 13 has the special advantage that the transfer elements engage with the respective stitch M to be transferred not in the radial direction but inclined thereto. As can be seen from the stitch designated at M in FIGURE 13, the stitch is widened by a transfer element which is inclined to the wale of stitches so that lateral widening of the stitch is not as much as occurs with the radial widening with the machines according to FIGURES 1 and 12.

FIGURE 13 also shows the possibility of producing a pattern in the stocking by the transfer of stitches. For this purpose, each one of the transfer elements 56, 56' is provided with two upwardly projecting lugs 61–64, one of which is long and the other one of which is short. Said lugs have opposite positions on the transfer elements 56 and 56' respectively. By a cam or pattern device of a common construction not illustrated, the transfer elements can be brought to the transfer position selectively or they can be kept in the retracted position. This makes it possible during the operation of this device to bring selectively all transfer elements, or to bring only selected elements, into the transfer position and to achieve in this manner desired effects of patterns. U.S. Patent No. 3,254,-509 illustrates a cam or pattern device for selectively engaging and reciprocating desired linearly movable elements. Such a pattern device could be utilized to selectively actuate the transfer elements 56 and 56'.

The invention is not restricted to the illustrated embodiments. Especially the sequence movement of the transfer elements could be conducted in a different manner. A variation of the operation principle could be conceivable inasmuch as the transfer of the stitch to be transferred from the transfer elements to a new needle could be effected not by raising of the needle but by a renewed lowering of the transfer elements. Furthermore, types of knittings are conceivable at which the stitches are not transferred from one wale of stitches to the adjacent wale but are transfered for example to every other wale of stitches.

Although a particular preferred embodiment of the invention has been disclosed above in detail for illustrative purposes, it will be recognized that variations or modifications of such disclosure, which come within the scope of the appended claims, are fully contemplated.

The embodiments of the invention in which an exclusive property or privilege is claimed are defined as follows:

1. A circular knitting machine for the manufacture of tubular knitted fabric, comprising:

knitting means for producing a tubular knitted fabric having a plurality of loops in a row and a plurality of adjacent rows whereby the aligned loops in adjacent rows define a plurality of wales which extend substantially transversely to the extending direction of the rows;

said knitting means including a hollow needle cylinder and means rotatably mounting same, and first drive means connected to said needle cylinder for rotating same;

said needle cylinder having a plurality of elongated slots therein and a plurality of knitting needles slideably mounted in said slots, said needles having knitting heads adjacent one end thereof with said heads defining a circular needle path, the heads of said needles being positioned adjacent one end of said needle cylinder and at least some of said heads being engaged with an edge row of the knitted fabric with the remainder of the tubular knitted fabric extending inside the needle cylinder in a direction away from the one end thereof;

transfer means for engaging from the inside of the tubular knitted fabric a loop in a row previously cast off from the needles and for moving said loop substantially (1) transversely from said cast-off row toward said needles and (2) laterally along said cast-off row from one wale to an adjacent wale for engaging said loop on one of said needles;

said transfer means including a carrier and means rotatably mounting same adjacent the end of said needle cylinder, said carrier being rotatable about an axis substantially parallel to the rotational axis of said needle cylinder;

said carrier having a plurality of guide slots formed therein and a plurality of substantially rigid transfer elements slideably mounted within said slots, said transfer elements having a loop engaging portion defining a closed path as said carrier rotates with a portion of said closed path substantially overlapping a portion of the needle path so as to define a loop transfer zone;

the loop engaging portion of said transfer elements being movable between an inoperative position spaced from the knitting and an operative position wherein the loop transfer portion is adapted to engage a loop of the knitted fabric when within the loop transfer zone, the loop engaging portion when in the inoperative position outside the loop transfer zone being positioned radially inwardly relative to the edge row of the tubular knitted fabric and closely adjacent the one end of the needle cylinder; and said loop transfer means including control means for moving said transfer elements from said inoperative to said operative position whereby the loop engaging portions engage, from the inside of the knitted fabric, loops of the cast-off row and move the engaged loops transversely relative to said cast-off row radially outwardly toward said knitting needles for engaging said loops with respective ones of said knitting needles, said control means also including second drive means rotatably driving said carrier at a rotational speed such that the loop engaging portion of said transfer elements rotates at an angular velocity different from the angular velocity of the heads of the knitting needles so as to move the engaged loops laterally into an adjacent wale.

2. A knitting machine according to claim 1, wherein said knitting cylinder comprises an upright hollow cylindrical member with the knitting needles being slideably mounted thereon, the heads of said needles being adjacent the upper ends thereof with said heads being substantially adjacent the upper end of said cylindrical member;

said knitting means further including a sinker supporting ring surrounding the upper end of the needle cylinder and synchronously rotating therewith, said sinker supporting ring having radially movable sinkers arranged therein and cooperating with the needles to form a knitting zone substantially adjacent the upper end of the needle cylinder;

said carrier being rotatably mounted adjacent to and slightly above the upper end of said cylindrical member with at least a portion of the carrier being closely adjacent the knitting zone so as to define said loop transfer zone, said carrier in the loop transfer zone being spaced from the upper end of the cylindrical member so as to define a slot therebetween for permitting the tubular knitted fabric to pass therethrough between said carrier and the upper end of the needle cylinder into the interior of the needle cylinder whereby the transfer elements engage the tubular knitted fabric from the inside thereof.

3. A knitting machine according to claim 2, wherein the rotational axis of said carrier lies within the circular needle path.

4. A knitting machine according to claim 3, wherein the control means includes first cam means cooperating with the transfer elements for causing same to move radially relative to the carrier and the needle cylinder;

said control means also including a second cam means cooperating with the transfer elements for moving the loop transfer portions thereof axially relative to the needle cylinder;

said first and second cam means maintaining the loop engaging portions of the transfer members in an axially raised and radially retracted position when outside the loop transfer zone, the loop engaging portions of the transfer members being axially lowered by the second cam means upon entering the loop transfer zone and being moved radially outwardly by the first cam means so as to engage a loop in the cast-off row, said second cam means then causing said loop engaging portions and the engaged loop to be lifted and moved laterally at least one wale so as to engage the loop on a needle head.

5. A circular knitting machine according to claim 4, further including a stationary housing in which said carrier is rotatably mounted, said stationary housing comprising an upper and lower housing shell, between which there is provided a circumferential slot for receiving the loop engaging portion of the transfer elements, said first cam means comprising a cam groove formed on said housing with said cam groove receiving therein a portion of said transfer elements, said second cam means comprising an axial extending cam ramp adjacent the outer edge of the housing for supporting the outer ends of the transfer elements.

6. A circular knitting machine according to claim 2, further including spring means coacting between each transfer element and its corresponding slot for frictionally retaining the transfer element in a selected position.

7. A circular knitting machine according to claim 2, wherein the guide slots in the carrier extend substantially radially relative to the needle cylinder with said transfer elements having a radial component of motion as said elements slide longitudinally along said slots.

8. A method of making a knitted fabric employing a circular group of substantially parallel needles and a group of transfer elements, comprising:

knitting a tubular fabric by forming loops upon the needles of the circular group in continuous succession;

moving the elements of the transfer group in succession from inside the tubular fabric radially outwardly toward the circular group of needles into engagement with preselected loops of the fabric previously cast off the needles of the circular group; and shifting by means of the elements of the transfer group the selected loops to embrace needles of the circular group adjacent the needles on which the selected loops were formed.

9. A method of making a knitted fabric as defined in claim 8, wherein the selected loops are moved onto said adjacent needles of the circular group by shifting the transfer elements circumferentially relative to the circular group after the elements of the transfer group engage the selected loops of the fabric.

References Cited

UNITED STATES PATENTS

| | | | |
|---|---|---|---|
| 1,270,084 | 6/1918 | Williams | 66—95 XR |
| 3,340,706 | 9/1967 | Currier | 66—95 XR |
| 597,092 | 1/1898 | Sturgess | 66—26 XR |
| 846,431 | 3/1907 | Scott | 66—95 |
| 1,817,566 | 8/1931 | Jones | 66—26 |
| 1,871,609 | 8/1932 | Harer | 66—95 |
| 2,051,724 | 8/1936 | Larkin | 66—95 XR |
| 2,060,020 | 11/1936 | Boaler | 66—95 |
| 2,106,872 | 2/1938 | Holmes | 66—24 |
| 2,286,806 | 6/1942 | Hurd et al. | 66—95 XR |
| 2,326,964 | 8/1943 | Nebel | 66—95 XR |
| 2,399,002 | 4/1946 | Coile | 66—95 XR |
| 2,761,302 | 9/1956 | Nebel | 66—95 XR |
| 3,110,167 | 11/1963 | Parthum | 66—95 |

FOREIGN PATENTS

| | | |
|---|---|---|
| 620,997 | 1/1927 | France. |
| 1,207,289 | 8/1959 | France. |
| 275,614 | 8/1928 | Great Britain. |

WM. CARTER REYNOLDS, Primary Examiner